United States Patent
James

(10) Patent No.: US 10,173,723 B2
(45) Date of Patent: Jan. 8, 2019

(54) STEERING WHEEL RECOUPLING MECHANISM FOR AUTONOMOUS VEHICLE

(71) Applicant: Toyota Research Institute, Inc., Los Altos, CA (US)

(72) Inventor: Michael R. James, Northville, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 36 days.

(21) Appl. No.: 15/430,292

(22) Filed: Feb. 10, 2017

(65) Prior Publication Data
US 2018/0229767 A1   Aug. 16, 2018

(51) Int. Cl.
| | | |
|---|---|---|
| *B60W 30/09* | (2012.01) | |
| *B60W 10/20* | (2006.01) | |
| *B60W 10/04* | (2006.01) | |
| *B60W 10/10* | (2012.01) | |
| *B60W 10/18* | (2012.01) | |
| *B62D 1/00* | (2006.01) | |
| *B62D 1/04* | (2006.01) | |
| *B62D 15/02* | (2006.01) | |
| *B62D 5/00* | (2006.01) | |
| *B62D 5/04* | (2006.01) | |

(52) U.S. Cl.
CPC .............. *B62D 15/02* (2013.01); *B62D 1/04* (2013.01); *B62D 5/006* (2013.01); *B62D 5/0409* (2013.01); *B62D 15/029* (2013.01); *B62D 15/0245* (2013.01)

(58) Field of Classification Search
CPC ...... B60W 30/09; B60W 10/20; B60W 10/04; B60W 10/10; B60W 10/18; B60W 2540/26; B60W 2600/00; B60W 2550/00; G08G 1/161
See application file for complete search history.

(56) References Cited

U.S. PATENT DOCUMENTS

| | | | |
|---|---|---|---|
| 7,708,091 B2 | 5/2010 | Osborne | |
| 9,623,907 B2* | 4/2017 | Marti | B62D 15/029 |
| 2012/0283912 A1 | 11/2012 | Lee et al. | |
| 2016/0200317 A1* | 7/2016 | Danzl | B60K 28/06 701/25 |
| 2016/0280267 A1 | 9/2016 | Lavoie et al. | |
| 2016/0368522 A1* | 12/2016 | Lubischer | B62D 1/181 |

(Continued)

FOREIGN PATENT DOCUMENTS

WO    WO2015145605    10/2015

*Primary Examiner* — Yonel Beaulieu
*Assistant Examiner* — Martin A Weeks
(74) *Attorney, Agent, or Firm* — Christopher G. Darrow; Darrow Mustafa PC

(57) ABSTRACT

This disclosure describes various embodiments for steering wheel recoupling for an autonomous vehicle. In an embodiment, a steering system is described. The steering system may comprise a steering wheel, wheels controlled by the steering wheel, and a wheel alignment control module. The wheel alignment control module may be configured to determine the steering wheel is decoupled from the steering system, determine a current angle of the wheels controlled by the steering wheel, activate an indicator, the indicator determined based, at least in part, upon the current angle, determine the steering wheel is positioned for recoupling, and recouple the steering wheel to the steering system.

20 Claims, 6 Drawing Sheets

(56) References Cited

U.S. PATENT DOCUMENTS

2016/0375925 A1* 12/2016 Lubischer .............. B62D 1/183
 701/41
2017/0106786 A1   4/2017 Ebina

* cited by examiner

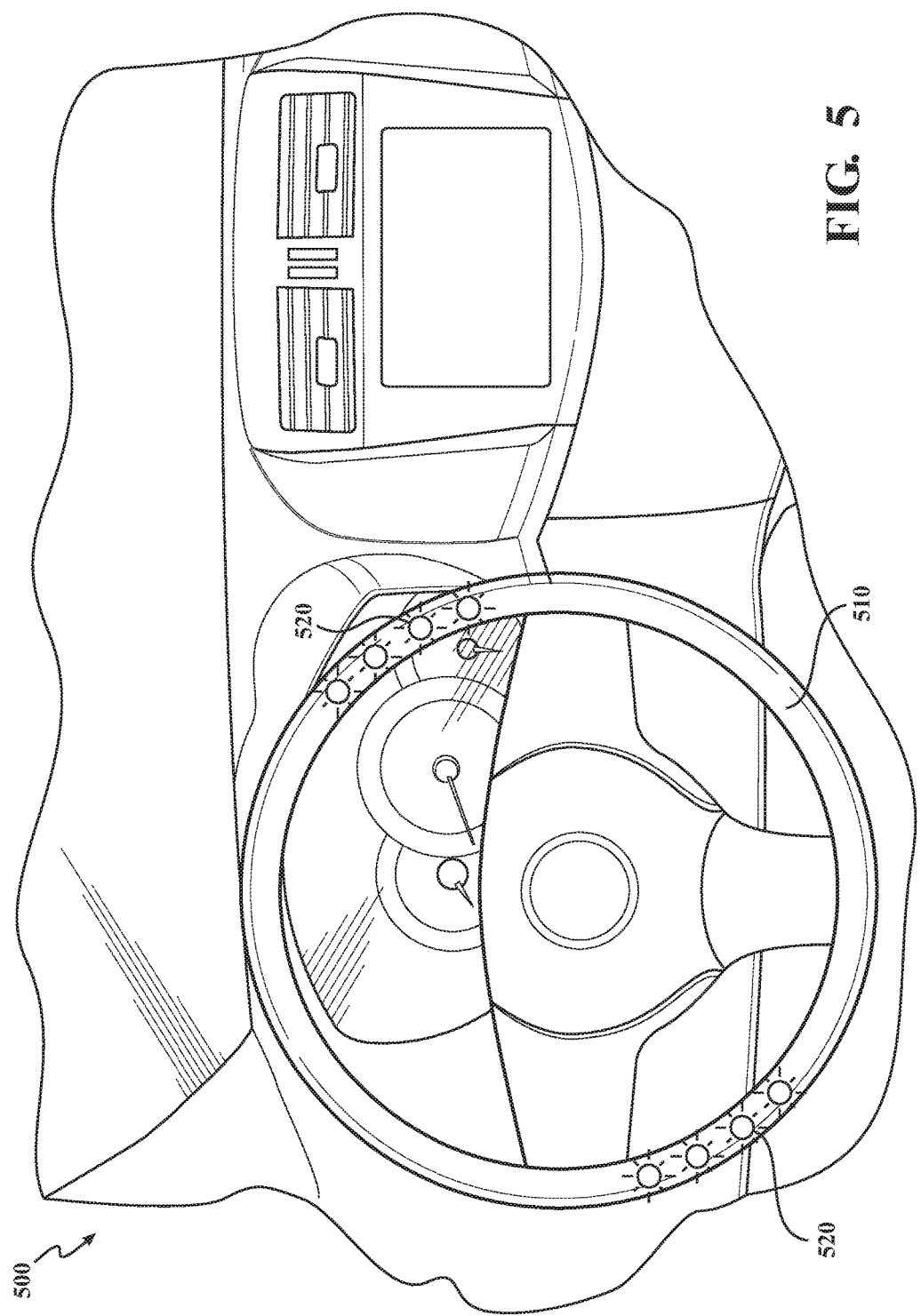

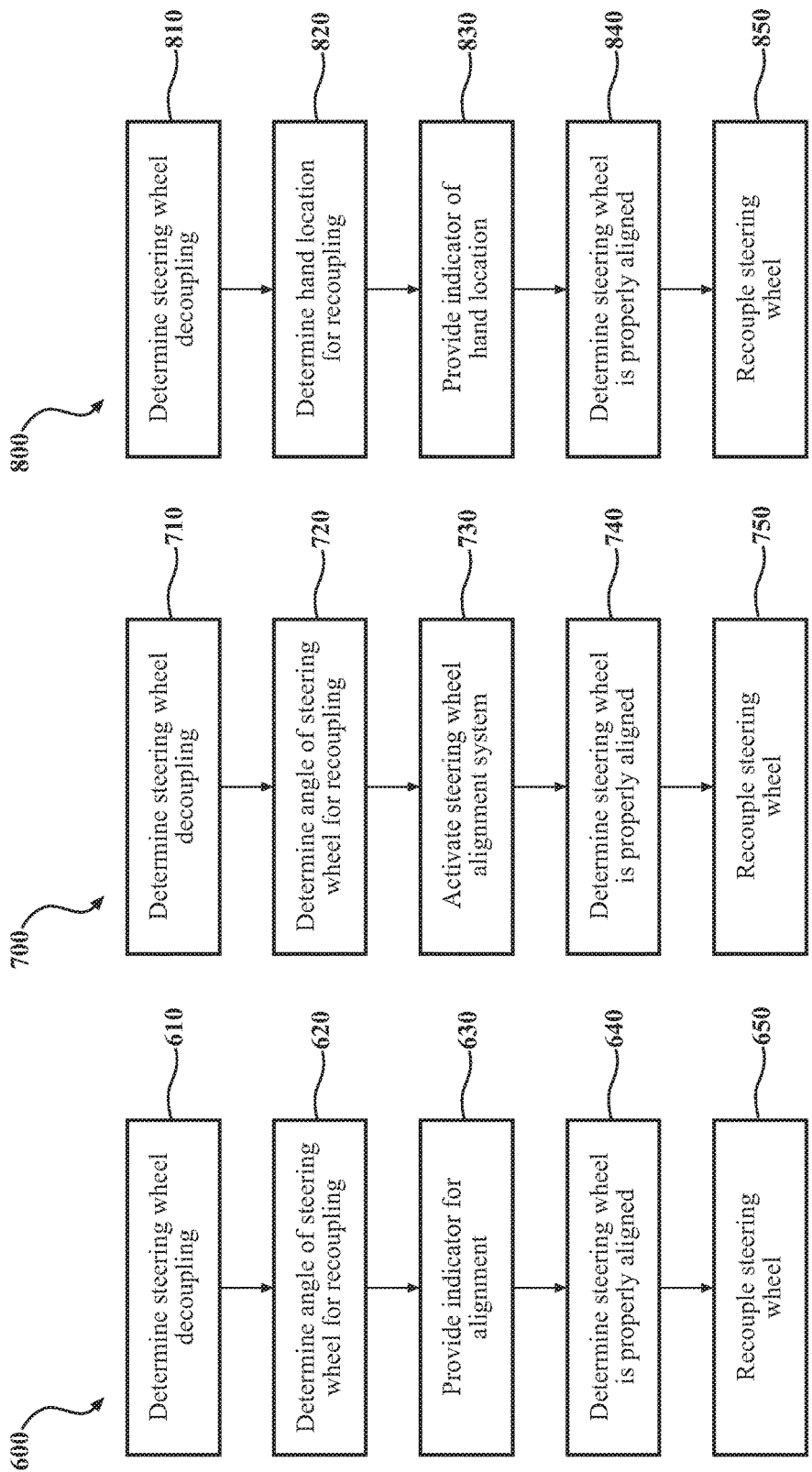

STEERING WHEEL RECOUPLING MECHANISM FOR AUTONOMOUS VEHICLE

TECHNICAL FIELD

The subject matter described herein relates in general to vehicle steering systems and, more particularly, to steering wheel recoupling mechanisms for autonomous vehicles.

BACKGROUND

Vehicles have steering wheels. Some vehicles are autonomous or partially autonomous. Autonomous and semi-autonomous vehicles control all or some of a vehicle's steering functions. The controlled functions include collision avoidance, lane departure assistance, and fully autonomous steering of the vehicle. Some vehicles are steered using a drive-by-wire system. In drive-by-wire vehicles, the steering wheel electronically controls the wheels. Electrical signals from one or more sensors couple to the steering wheel control the vehicle's wheels. Some vehicles are steered using mechanical steering. In mechanically steered vehicles, the steering wheel is mechanically coupled to the vehicle's wheels to control steering.

SUMMARY

This disclosure describes various embodiments for steering wheel recoupling for an autonomous vehicle. In an embodiment, a steering system is described. The steering system may comprise a steering wheel, wheels controlled by the steering wheel, and a wheel alignment control module. The wheel alignment control module may be configured to determine the steering wheel is decoupled from the steering system, determine a current angle of the wheels controlled by the steering wheel, activate an indicator, the indicator determined based, at least in part, upon the current angle, determine the steering wheel is positioned for recoupling, and recouple the steering wheel to the steering system.

In another embodiment, a method for recoupling a steering wheel to a steering system is described. The method may comprise determining the steering wheel is decoupled from the steering system, determining a current angle of wheels controlled by the steering wheel, determining to activate an indicator based, at least in part, upon the current angle, activating the indicator, determining the steering wheel is positioned for recoupling, and recoupling the steering wheel to the steering system.

In another embodiment, a steering system is described. The steering system may comprise a steering wheel, wheels controlled by the steering wheel, an alignment motor coupled to the steering wheel, and a wheel alignment control module. The wheel alignment control module may be configured to determine the steering wheel is decoupled from the steering system, determine a current angle of the wheels controlled by the steering wheel, determine an alignment angle for the steering wheel, the alignment angle selected to align the steering wheel with the wheels controlled by the steering wheel, activate the alignment motor to rotate the steering wheel to the alignment angle, determine the steering wheel is positioned for recoupling, and recouple the steering wheel to the steering system.

BRIEF DESCRIPTION OF THE DRAWINGS

FIG. 5 is a diagram of an embodiment of a system for recoupling a steering wheel with hand placement indicators.

FIG. 6 is a flow diagram of an embodiment of a method for recoupling a steering wheel using visual indicators.

FIG. 7 is a flow diagram of an embodiment of a method for recoupling a steering wheel without visual indicators.

FIG. 8 is a flow diagram of an embodiment of a method for recoupling a steering wheel with hand placement indicators.

DETAILED DESCRIPTION

Described herein are systems and methods for recoupling a decoupled steering wheel in an autonomous vehicle. As used herein, autonomous vehicle includes partially autonomous vehicles and fully autonomous vehicles. An autonomous vehicle may comprise systems for controlling the steering of the vehicle. Changing the path of the vehicle without moving the steering wheel, which may be held by the driver, may be necessary in certain situations. In this case, the steering wheel may be decoupled from the vehicle wheels. For example, if a sudden lateral motion is required by a semi-autonomous or fully-autonomous vehicle, it may be dangerous to move the steering wheel, which may be held by the driver, with large amounts of force. When the autonomous vehicle is controlling the steering of the vehicle, e.g., during an overtake operation, the wheels of the vehicle may move independently of the steering wheel. In this case, the steering wheel may be decoupled from the steering system of the vehicle. When the steering wheel is decoupled from the steering system, the angle of rotation of the steering wheel may not correspond to the angle of the vehicle's wheels. If the steering wheel is recoupled to the steering system when the steering wheel is not aligned with the wheels, positioning the steering wheel to drive forward may result in unexpected vehicle motion.

The steering system may be configured to align and/or assist the driver in aligning the steering wheel before recoupling the steering wheel to the steering system. In an embodiment, an indicator may be placed on the steering wheel. The indicator on the steering wheel may be aligned with some other indicator on the dash or in the instrument cluster prior to recoupling. In another embodiment, an indicator on the dash or in the instrument cluster may direct the driver to rotate the wheel in a specific direction, e.g. an arrow or the words "rotate clockwise" etc. The indicator may also indicate when the wheel is aligned for recoupling. In another embodiment, indicators may be placed around the edge of the steering wheel. The indicators may illuminate indicating where the driver's hands should be placed on the wheel for alignment. In another embodiment, an audible indication may be provided to the driver. For example, the vehicle's audio system may play an instruction to rotate the wheel in a particular direction for alignment. In another embodiment, a motor or other mechanism for rotating the steering wheel may automatically rotate the steering wheel into alignment. Any combination of the preceding embodiments may be used in aligning the steering wheel for recoupling. The embodiments may be used with traditional mechanical steering systems and/or drive-by-wire systems, or any other steering system where a steering wheel may become electrically or physically decoupled from the steering system.

Figure 1:
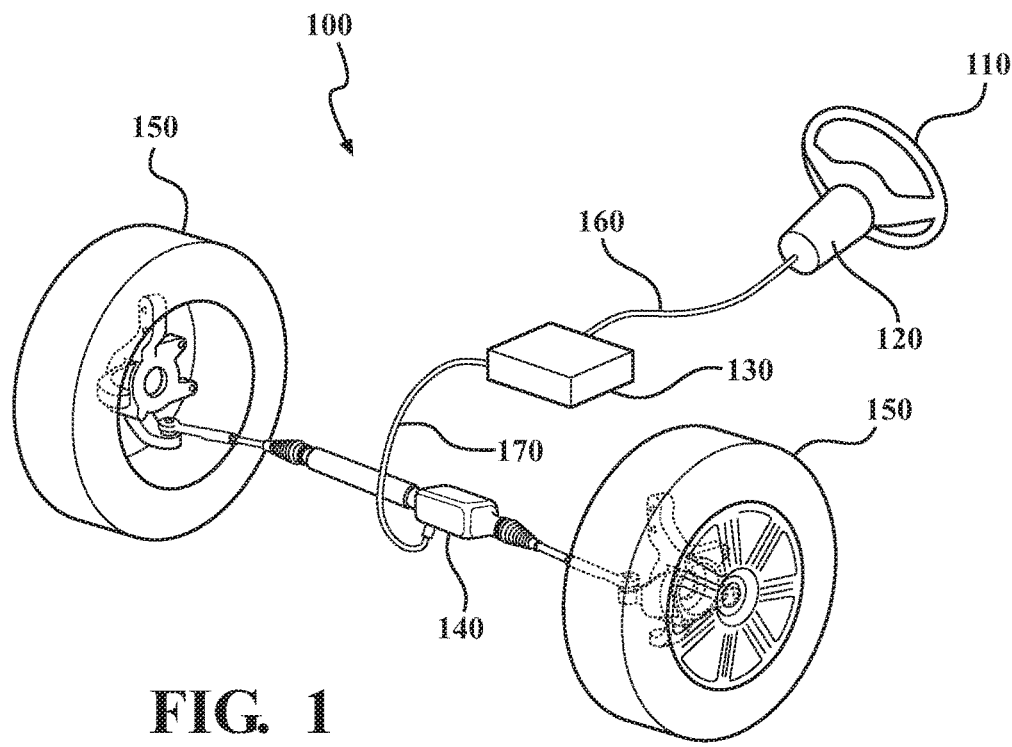
FIG. 1 is a diagram of an embodiment of a drive-by-wire steering system.

FIG. 1 is a diagram of an embodiment of a drive-by-wire steering system 100. The drive-by-wire steering system 100 may comprise a steering wheel 110, steering column 120, control system 130, wheel control assembly 140, wheels 150, and communication lines 160 and 170. Steering wheel 110 may be coupled to steering column 120. Steering wheel 110 and/or steering column 120 may contain sensors for detecting the rotational angle of the steering wheel 110. The determined angle of the steering wheel 110 may be transmitted via communication line 160 to control system 130. Control system 130 may control the wheel control assembly 140 via communication line 170. The control system 130 may control the wheel control assembly 140 to move tires 150 to an angle corresponding to the angle of steering wheel 110. Wheel control assembly 140 may contain sensors for detecting the angle of the wheels 150. Feedback comprising the angle of the wheels 150 may be transmitted via communication line 170 to control system 130. Control system 130 may provide feedback to steering wheel 110 and/or steering column 120. Control system 130 may be a standalone system or may be part of another system within the vehicle. Steering column 120 may comprise a motor to adjust the steering wheel 110 based on the received feedback. The motors and sensors may be part of a servo motor system or other system that measures position of the wheels 150 and steering wheel 110 and adjusts one or the other accordingly.

In an autonomous vehicle, an autonomous controller (not pictured) may provide control commands to control system 130. The commands provided by the autonomous controller may cause a decoupling of steering wheel 110 and/or steering column 120 from the drive-by-wire steering system 100. In a drive-by-wire steering system, decoupling may be an electronic decoupling because there is not a mechanical coupling between the steering wheel and wheels 150. An electronic decoupling may occur when the detected angle of steering wheel 110 does not correspond to the angle of the wheels 150. Control system 130, or some other vehicle subsystem, may monitor the position of the wheels 150 and steering wheel 120. The position of the wheels may be provided to a wheel alignment control module. The wheel alignment control module may be software, hardware, or both used to control the alignment of the steering wheel for recoupling. The wheel alignment control module may be part of control system 130 or some other system of the vehicle. The wheel alignment control module may be a standalone component of the vehicle.

Figure 2:
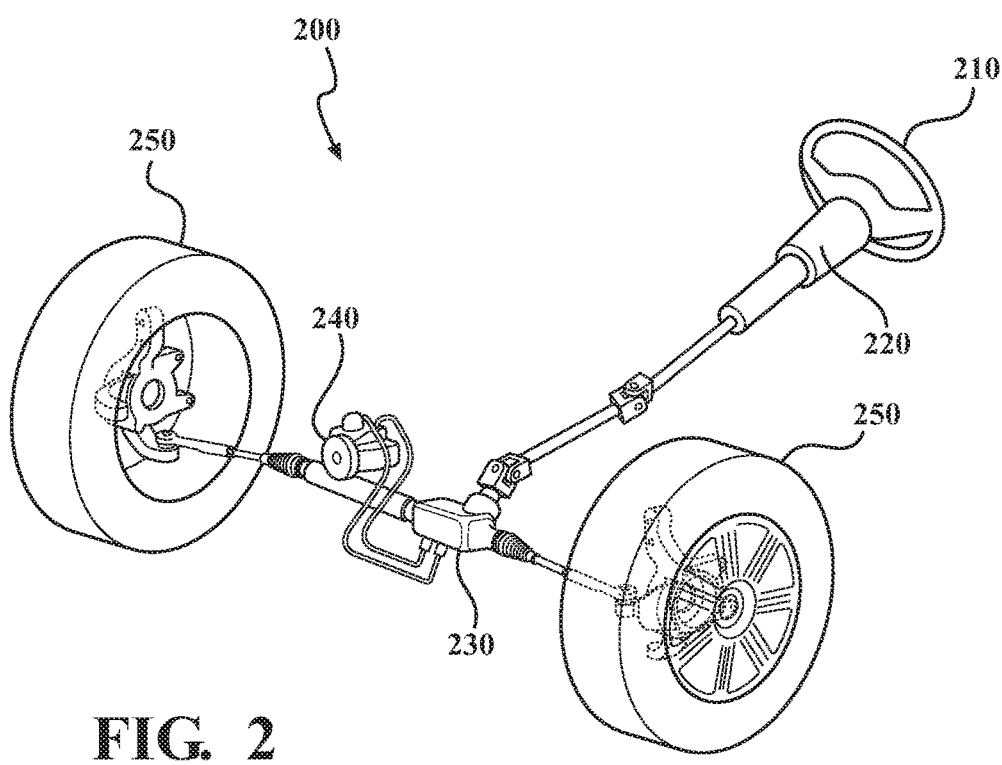
FIG. 2 is a diagram of an embodiment of a mechanical steering system.

FIG. 2 is a diagram of an embodiment of a mechanical steering system 200. The mechanical steering system 200 may comprise a steering wheel 210, steering linkage 220, steering rack 230, power steering pump 240, and wheels 250. Steering wheel 210 may be coupled to steering linkage 220 which may be coupled to steering rack 230. Rotating steering wheel 210 may cause steering linkage 220 to rotate, in turn rotating steering rack 230 and wheels 250. Turning steering wheel 210 may be assisted by power steering pump 240.

In an autonomous vehicle, an autonomous controller (not pictured) may control all or a portion of the functions of mechanical steering system 200. When the autonomous controller is controlling all or a portion of the steering functions, the steering wheel 210 may become decoupled from the mechanical steering system 200. When the steering wheel 210 is decoupled, the wheels and steering rack 230 may move independently of the steering wheel 210. In this case, the angle of the wheels 250 may not correspond to the angle of the steering wheel 210. The position of the wheels 250 and steering wheel 210 may be monitored by an electronic control unit (ECU) (not pictured), the autonomous controller, or some other system in the vehicle. The position of the wheels may be provided to a wheel alignment control module. The wheel alignment control module may be software, hardware, or both used to control the alignment of the steering wheel for recoupling. The wheel alignment control module may be part of an ECU or some other system of the vehicle. The wheel alignment control module may be a standalone component of the vehicle.

Figure 3:
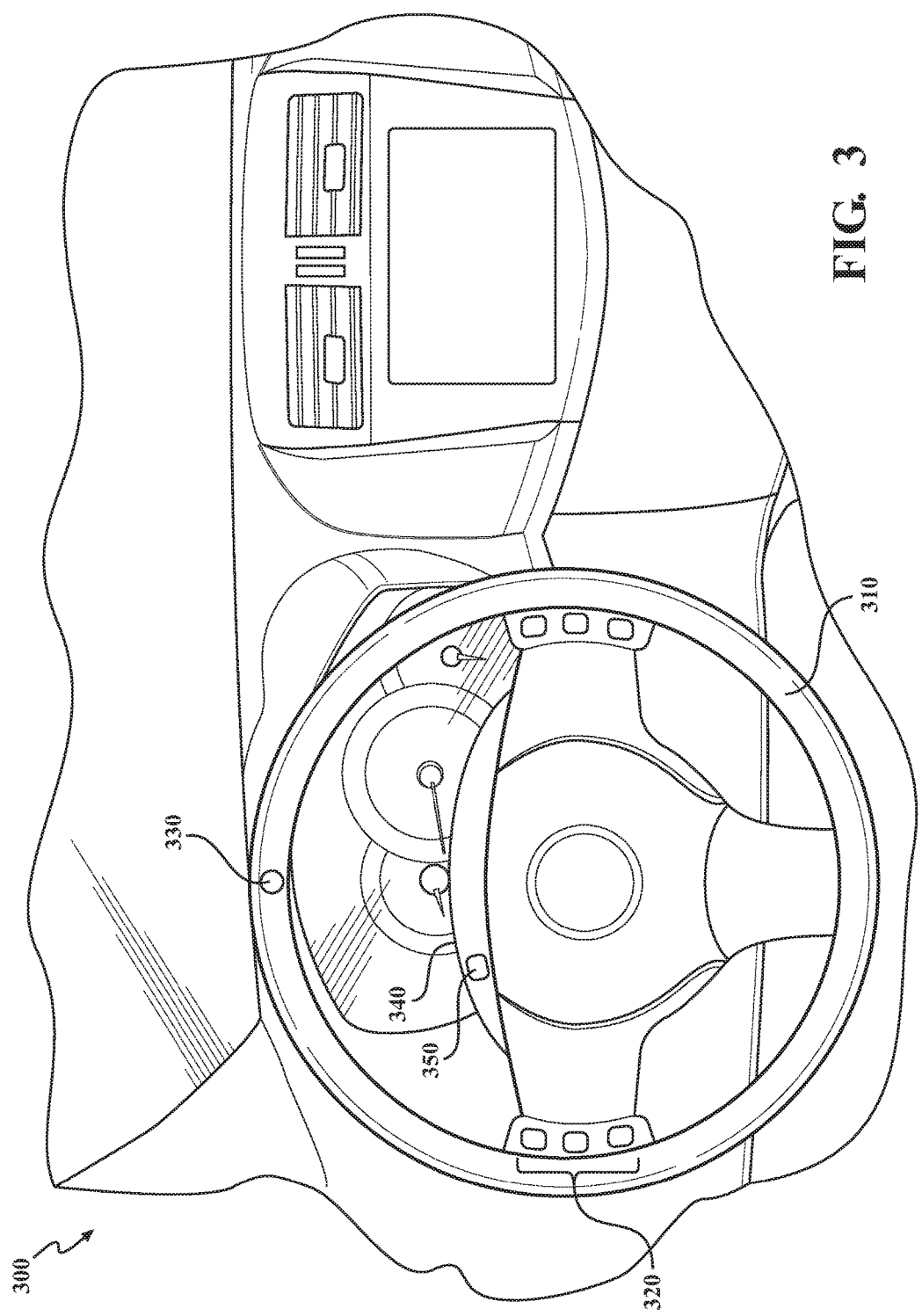
FIG. 3 is a diagram of an embodiment of a system for recoupling a steering wheel with visual indicators.

FIG. 3 is a diagram of an embodiment of a system 300 for recoupling steering wheel 310 with visual indicators. As previously described herein, when a vehicle operates autonomously, the steering wheel 310 may become decoupled from the steering system. The decoupling may be either electronic or mechanical depending upon the type of steering system used in the vehicle. After steering wheel 310 is decoupled, the vehicle may determine to recouple steering wheel 310 to the steering system. The vehicle may determine to recouple based upon a number of factors including, but not limited to a driver gripping steering wheel 310, the vehicle exiting autonomous mode, or some other input indicating that the driver wishes to have control of the vehicle.

In response to determining that the steering wheel 310 is to be recoupled, a wheel alignment control module (not pictured) in the vehicle may compare the current angle of the tires to the current angle of the steering wheel 310. The wheel alignment control module may determine that the current angle of the tires does not correspond to the current angle of the steering wheel 310. For example, controls 320 may need to be in a certain orientation for the driver to use them. For example, when the vehicle is driving straight ahead, the controls 320 may be at the left of the wheel and any writing on the controls may be right-side up while the vehicle is driving straight ahead. The wheel alignment control module may determine which way and how far the steering wheel 310 should be rotated in order to correspond to the angle of the tires and/or properly orient controls 320. After determining which way and how far to turn the steering wheel 310, the wheel alignment control module may provide an indication to the driver of the vehicle.

The indication provided to the driver may be an indicator 330 on steering wheel 310 that is illuminated or otherwise highlighted for the driver. The steering wheel may then be rotated to align indicator 330 with a dash indicator 350 or some other fixed point on the dash or in the instrument cluster of the vehicle. In an embodiment, indicator 330 may be selected to be in the twelve-o'clock position when the wheel is properly aligned. In this case, a second indicator, e.g., indicator 350, may not be needed. Indicator 350 may be part of a display 340. Indicator 350 may be displayed in a fixed location, or may be displayed in a variable position. In some embodiments, indicator 330 may not be present on the steering wheel. In this case, the indicator 350 may be an arrow or other type of indicator that indicates to rotate steering wheel 310 in a particular direction for alignment. The indicator may change when the steering wheel 310 is aligned or close to alignment. For example, the indicator 330 and/or 350 may be red while the steering wheel 310 is unaligned, as steering wheel 310 approaches alignment, the indicator 330 and/or 350 may change color to yellow. When the steering wheel 310 is properly aligned, the indicator 330 and/or 350 may turn green. The colors used in the preceding example are not meant to be limiting, but are used as an example. Other colors and indications may be used.

Figure 4:
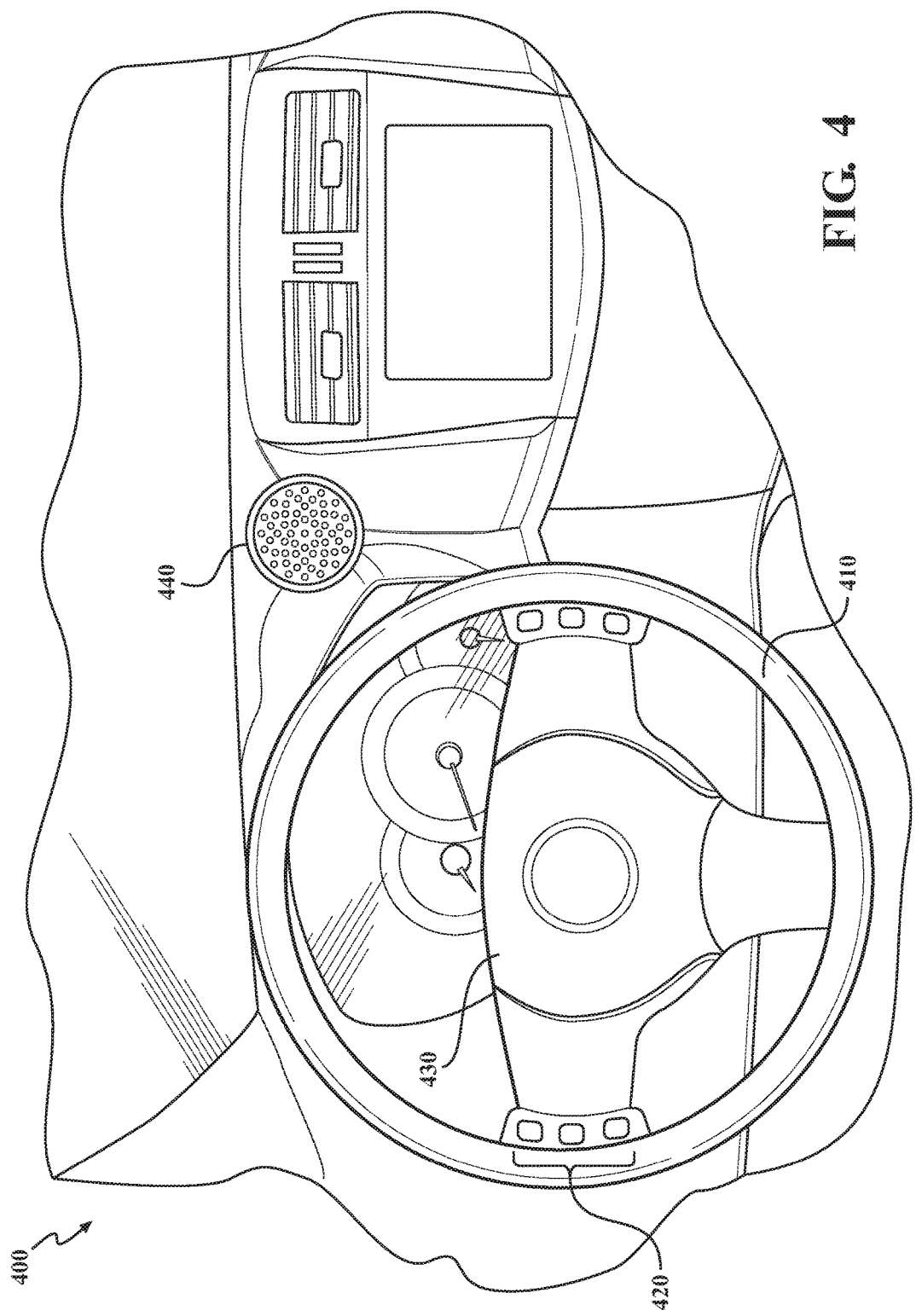
FIG. 4 is a diagram of an embodiment of a system for recoupling a steering wheel without visual indicators.

FIG. 4 is a diagram of an embodiment of a system 400 for recoupling steering wheel 410 without visual indicators. As previously described herein, when a vehicle operates autonomously, the steering wheel 410 may become decoupled from the steering system. The decoupling may be either electronic or mechanical depending upon the type of steering system used in the vehicle. After steering wheel 410 is decoupled, the vehicle may determine to recouple steering wheel 410 to the steering system. The vehicle may determine to recouple based upon a number of factors including, but not limited to a driver gripping steering wheel 410, the vehicle exiting autonomous mode, or some other input indicating that the driver wishes to have control of the vehicle.

In response to determining that the steering wheel 410 is to be recoupled, a wheel alignment control module in the vehicle may compare the current angle of the tires to the current angle of the steering wheel 410. The wheel alignment control module may determine that the current angle of the tires does not correspond to the current angle of the steering wheel 410. For example, controls 420 may need to be in a certain orientation for the driver to use them. E.g., when the vehicle is driving straight ahead, the controls 420 may be at the left of the wheel and any writing on the controls 420 may be right-side up while the vehicle is driving straight ahead. The wheel alignment control module may determine which way and how far the steering wheel 410 should be rotated in order to correspond to the angle of the tires and/or properly orient controls 420.

After determining which way and how far to turn the steering wheel 410, the wheel alignment control module may cause a motor or other drive mechanism to rotate steering wheel 410 to align for recoupling. In an embodiment, the motor or drive mechanism may be installed in steering column 430. In another embodiment, no motor or drive mechanism may be used. In this case, the wheel alignment control module may provide an audible indicator to the driver. The audible indication may be instructions to rotate the wheel clockwise or counterclockwise. The audible indication may also indicate when the wheel is aligned for recoupling. The audible indication may be provided via speaker 440 or some other audio playback device.

FIG. 5 is a diagram of an embodiment of a system 500 for recoupling steering wheel 510 with hand placement indicators 520 and 530. As previously described herein, when a vehicle operates autonomously, the steering wheel 510 may become decoupled from the steering system. The decoupling may be either electronic or mechanical depending upon the type of steering system used in the vehicle. After steering wheel 510 is decoupled, the vehicle may determine to recouple steering wheel 510 to the steering system. The vehicle may determine to recouple based upon a number of factors including, but not limited to a driver gripping steering wheel 510, the vehicle exiting autonomous mode, or some other input indicating that the driver wishes to have control of the vehicle.

In response to determining that the steering wheel 510 is to be recoupled, a wheel alignment control module in the vehicle may determine the current angle of the tires. Upon determining the current angle of the tires, the wheel alignment control module may determine a location for hands to be placed on the steering wheel to correspond to the current angle of the tires. Steering wheel 510 may not have controls that need to be used at a certain orientation. Thus, steering wheel 510 may not need to be rotated for recoupling, but the location of the driver's hands may need to be indicated. Upon determining hand placement for recoupling, the wheel alignment control module may cause indicators 520 and 530 to illuminate indicating where the driver should place their hands prior to recoupling. Indicator 520 may be illuminated for the driver's left hand and indicators 530 may be illuminated for the driver's right hand. Any number of indicators 520 and 530 may be illuminated to indicate the position of the driver's hands.

FIG. 6 is a flow diagram of an embodiment of a method 600 for recoupling a steering wheel using visual indicators. The method 600 begins at block 610 when a wheel alignment control module within an autonomous vehicle determines the steering wheel has become decoupled from the steering system. At block 620, the wheel alignment control module determines a steering wheel angle for alignment prior to recoupling. At block 630, the wheel alignment control module provides an indicator for alignment of the steering wheel for recoupling. For example, indicator 330, indicator 350, and/or an audible indicator. At block 640, the wheel alignment control module may determine the steering wheel is aligned for recoupling. At block 650, the wheel alignment control module may recouple the steering wheel to the steering system.

FIG. 7 is a flow diagram of an embodiment of a method 700 for recoupling a steering wheel. The method 700 begins at block 710 when a wheel alignment control module within an autonomous vehicle determines the steering wheel has become decoupled from the steering system. At block 720, the wheel alignment control module may determine a steering wheel angle for alignment prior to recoupling. At block 730, the wheel alignment control module may activate a steering wheel alignment system. The steering wheel alignment system may comprise a motor or other mechanism for automatically turning the steering wheel to align for recoupling. At block 740, the wheel alignment control module may determine that the steering wheel is aligned for recoupling. At block 650, the wheel alignment control module may recouple the steering wheel to the steering system.

FIG. 8 is a flow diagram of an embodiment of a method 800 for recoupling a steering wheel. The method 800 begins at block 810 when a wheel alignment control module within an autonomous vehicle determines the steering wheel has become decoupled from the steering system. At block 820, the wheel alignment control module may determine where a driver's hands may be placed on the steering wheel based upon the current angle of the vehicle's wheels. At block 830, the wheel alignment control module may illuminate indicators on the steering wheel indicating the position where the driver's hands should be to align with the alignment of the vehicle's wheels. At block 840, the wheel alignment control module may determine that the driver's hands are on the steering wheel at the correct location. Determining the driver's hands are in place may be based on sensors in the steering wheel, an input received from the driver, and/or some other mechanism for detecting the presence of the driver's hands on the steering wheel. Upon determining the driver's hands are in the correct location, the wheel alignment control module may recouple the steering wheel at block 850.

Figure 9:
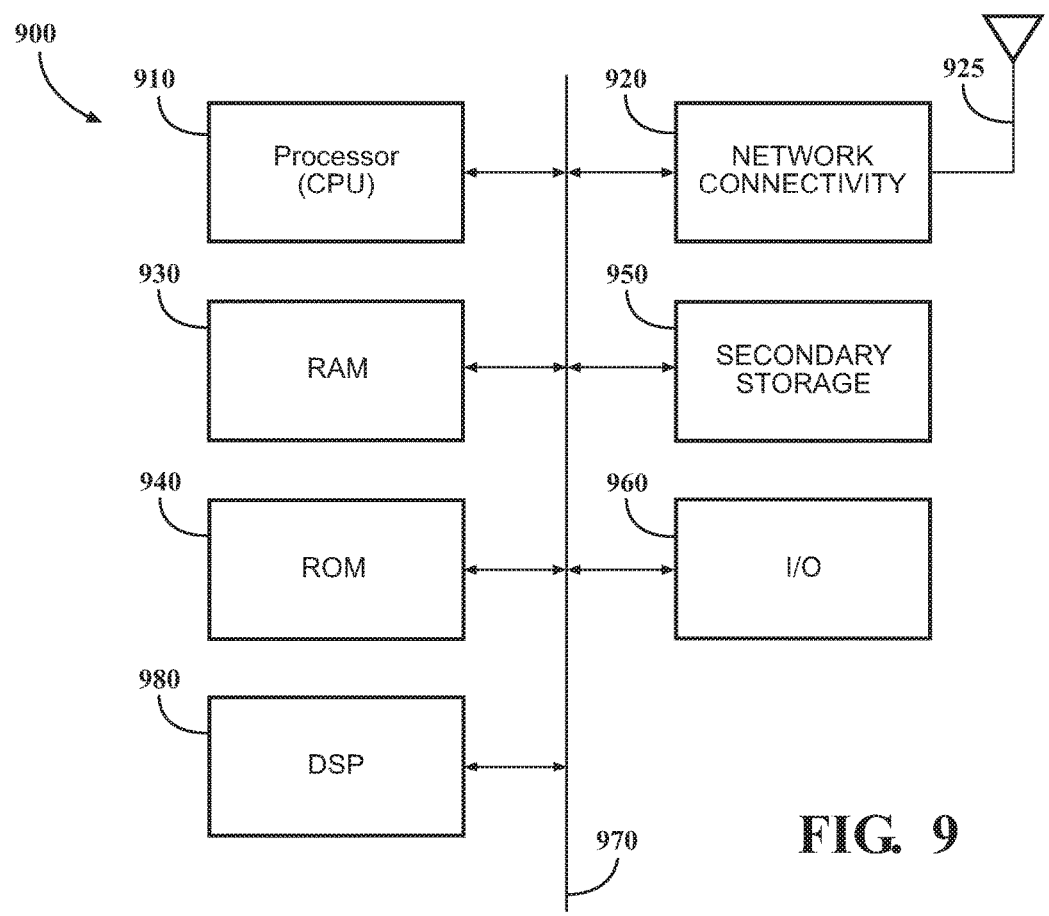
FIG. 9 is a diagram of an embodiment of a system controller for recoupling the steering wheel.

FIG. 9 is a diagram of an embodiment of a system 900 that includes a processor 910 suitable for implementing one or more embodiments disclosed herein, e.g., a wheel alignment control module for recoupling the steering wheel. The wheel alignment control module may be a discreet component of an autonomous vehicle, or may be part of some other subsystem of the autonomous vehicle. The processor 910 may control the overall operation of the system.

In addition to the processor 910 (which may be referred to as a central processor unit or CPU), the system 900 might include network connectivity devices 920, random access memory (RAM) 930, read only memory (ROM) 940, secondary storage 950, and input/output (I/O) devices 960. These components might communicate with one another via a bus 970. In some cases, some of these components may not be present or may be combined in various combinations with one another or with other components not shown. These components might be located in a single physical entity or in more than one physical entity. Any actions described herein as being taken by the processor 910 might be taken by the processor 910 alone or by the processor 910 in conjunction with one or more components shown or not shown in the drawing, such as a digital signal processor (DSP) 980. Although the DSP 980 is shown as a separate component, the DSP 980 might be incorporated into the processor 910.

The processor 910 executes instructions, codes, computer programs, or scripts that it might access from the network connectivity devices 920, RAM 930, ROM 940, or secondary storage 950 (which might include various disk-based systems such as hard disk, floppy disk, or optical disk). For example, the wheel alignment control module at be any combination of computer readable instructions, codes, computer programs, or scripts.

While only one CPU 910 is shown, multiple processors may be present. Thus, while instructions, e.g., a wheel alignment control module. may be discussed as being executed by a processor, the instructions may be executed simultaneously, serially, or otherwise by one or multiple processors. The processor 910 may be implemented as one or more CPU chips and may be a hardware device capable of executing computer instructions.

The network connectivity devices 920 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, controller area network (CAN), domestic digital bus (D2B), and/or other well-known devices for connecting to networks. These network connectivity devices 920 may enable the processor 910 to communicate with the Internet or one or more telecommunications networks or other networks from which the processor 910 might receive information or to which the processor 910 might output information. The network connectivity devices 920 might also include one or more transceiver components 925 capable of transmitting and/or receiving data wirelessly.

The RAM 930 might be used to store volatile data and perhaps to store instructions that are executed by the processor 910. The ROM 940 is a non-volatile memory device that typically has a smaller memory capacity than the memory capacity of the secondary storage 950. ROM 940 might be used to store instructions and perhaps data that are read during execution of the instructions. Access to both RAM 930 and ROM 940 is typically faster than to secondary storage 950. The secondary storage 950 is typically comprised of one or more disk drives or tape drives and might be used for non-volatile storage of data or as an over-flow data storage device if RAM 930 is not large enough to hold all working data. Secondary storage 950 may be used to store programs that are loaded into RAM 930 when such programs are selected for execution.

The I/O devices 960 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 925 might be considered to be a component of the I/O devices 960 instead of or in addition to being a component of the network connectivity devices 920.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

It will be understood by one having ordinary skill in the art that construction of the described invention and other components is not limited to any specific material. Other exemplary embodiments of the invention disclosed herein may be formed from a wide variety of materials, unless described otherwise herein.

As used herein, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. A steering system, comprising:
   a steering wheel;
   wheels controlled by the steering wheel; and
   a wheel alignment controller configured to:
      determine the steering wheel is decoupled from the steering system;
      determine a current angle of the wheels controlled by the steering wheel;
      activate an indicator, the indicator determined based, at least in part, upon the current angle, the indicator aiding positioning of the steering wheel for recoupling the steering wheel to the steering system;
      determine the steering wheel is positioned for recoupling; and
      recouple the steering wheel to the steering system.

2. The steering system of claim 1, wherein the wheel alignment controller is further configured to determine a corresponding angle of the steering wheel, the corresponding angle determined to align the steering wheel with the current angle of the wheels controlled by the steering wheel.

3. A steering system, comprising:
   a steering wheel;
   wheels controlled by the steering wheel; and
   a wheel alignment controller configured to:
      determine the steering wheel is decoupled from the steering system;
      determine a current angle of the wheels controlled by the steering wheel;
      determine a corresponding angle of the steering wheel, the corresponding angle determined to align the steering wheel with the current angle of the wheels controlled by the steering wheel;
      activate an indicator, the indicator determined based, at least in part, upon the current angle, wherein the indicator includes an audible indication and the indicator is configured to indicate a direction of rotation;
      determine the steering wheel is positioned for recoupling; and
      recouple the steering wheel to the steering system.

4. The steering system of claim 2, wherein the indicator comprises a console indicator configured to indicate a direction of rotation.

5. The steering system of claim 2, wherein the steering wheel comprises the indicator, the indicator configured to indicate a direction of rotation.

6. The steering system of claim 2, wherein the steering wheel comprises the indicator and the system further comprises a console indicator.

7. The steering system of claim 1, wherein the indicator comprises a plurality of indicators on the steering wheel, the plurality of indicators indicating a first position for a left hand and a second position for a right hand.

8. The steering system of claim 7, wherein the wheel alignment controller is further configured to detect placement of hands on the steering wheel.

9. The steering system of claim 1, wherein the wheel alignment controller is further configured to determine the steering system is transitioning from an autonomous mode to a manual mode.

10. A method for recoupling a steering wheel to a steering system, the method comprising:
    determining the steering wheel is decoupled from the steering system;
    determining a current angle of wheels controlled by the steering wheel;
    determining to activate an indicator based, at least in part, upon the current angle;
    activating the indicator, the indicator aiding positioning of the steering wheel for recoupling the steering wheel to the steering system;
    determining the steering wheel is positioned for recoupling; and
    recoupling the steering wheel to the steering system.

11. The method of claim 10, further comprising determining a corresponding angle of the steering wheel, the corresponding angle determined to align the steering wheel with the current angle of the wheels controlled by the steering wheel.

12. The method of claim 11, wherein activating the indicator comprises playing an audible indication, the audible indication indicating a direction of rotation.

13. The method of claim 11, wherein activating the indicator comprises activating a console indicator, the console indicator indicating a direction of rotation.

14. The method of claim 11, wherein the steering wheel comprises the indicator, the indicator indicating a direction of rotation.

15. The method of claim 11, wherein the steering wheel comprises the indicator and the method further comprises activating a console indicator.

16. The method of claim 10, wherein activating the indicator comprises activating a plurality of indicators on the steering wheel, the plurality of indicators indicating a first position for a left hand and a second position for a right hand.

17. The method of claim 16, further comprising detecting placement of hands on the steering wheel.

18. The method of claim 10, further comprising determining the steering system is transitioning from an autonomous mode to a manual mode.

19. A steering system comprising:
a steering wheel;
wheels controlled by the steering wheel;
an alignment motor coupled to the steering wheel; and
a wheel alignment controller module configured to:
- determine the steering wheel is decoupled from the steering system;
- determine a current angle of the wheels controlled by the steering wheel;
- determine an alignment angle for the steering wheel, the alignment angle selected to align the steering wheel with the wheels controlled by the steering wheel;
- activate the alignment motor to rotate the steering wheel to the alignment angle;
- determine the steering wheel is positioned for recoupling; and
- recouple the steering wheel to the steering system.

20. The steering system of claim 19, wherein the wheel alignment controller is further configured to determine the steering system is transitioning from an autonomous mode to a manual mode.

\* \* \* \* \*

UNITED STATES PATENT AND TRADEMARK OFFICE
CERTIFICATE OF CORRECTION

PATENT NO. : 10,173,723 B2
APPLICATION NO. : 15/430292
DATED : January 8, 2019
INVENTOR(S) : Michael R. James Page 1 of 1

It is certified that error appears in the above-identified patent and that said Letters Patent is hereby corrected as shown below:

In the Claims

Claim 19, Column 11, Line 5, delete "module" after "controller"

Signed and Sealed this
Twenty-sixth Day of February, 2019

Andrei Iancu
*Director of the United States Patent and Trademark Office*